May 22, 1923.
A. BUDIL
AIR FILTER
Filed Aug. 30, 1921
1,456,360
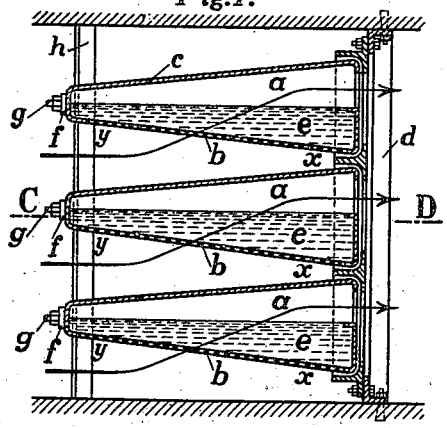
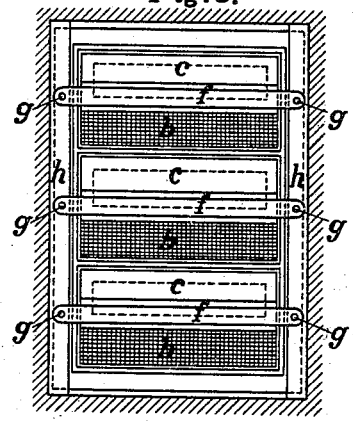
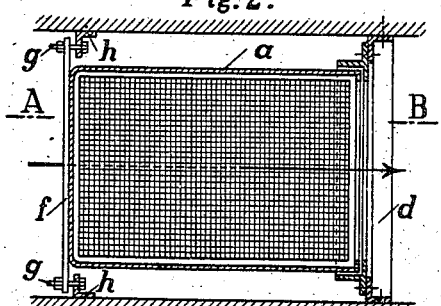
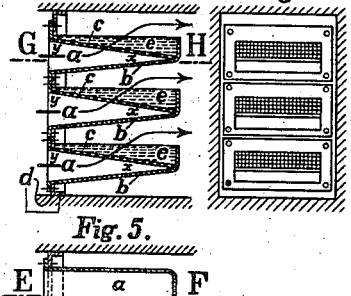
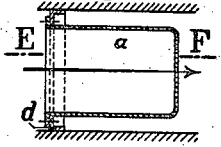
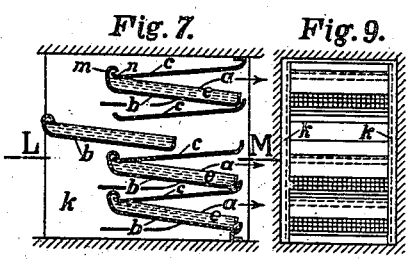
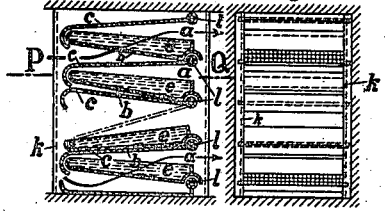
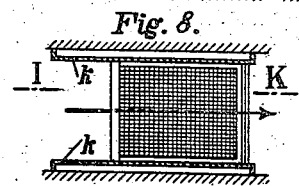
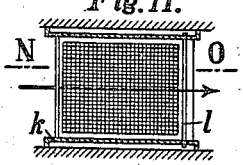
Inventor:
Alfred Budil Patented May 22, 1923.

1,456,360

UNITED STATES PATENT OFFICE.

ALFRED BUDIL, OF BERLIN-TEMPELHOF, GERMANY.

AIR FILTER.

Application filed August 30, 1921. Serial No. 496,937.

*To all whom it may concern:*

Be it known that I, ALFRED BUDIL, a citizen of the Czechoslovakian Republic, residing at Berlin-Tempelhof and State of Germany, have invented certain new and useful Improvements in an Air Filter, of which the following is a specification.

My invention relates to an air filter with undulating, zigzag or similar surfaces which are covered with filtering material and which are traversed transversely by the air to be purified. The object of the invention is to make space economizing use of loose or layers of filtering material (e. g. filling materials or plates of metal, stoneware, porcelain, glass, etc.) peculiar to these filters also capable of being used where hitherto pocket filters covered with woven fabrics were necessary. To attain this end each undulation or the part of the undulation covered with the filtering material is arranged according to the invention so as to be capable of being withdrawn with respect to the course of the undulation, so that the advantages of the filters with undulating surfaces which are covered with loose filtering material are combined with the advantages of the pocket filters which are covered with woven fabrics. The best filtering action is secured when the part of the undulation which drops towards the pure air side is used as a filtering surface, as in consequence of the congestion of the air between the inclined halves of the undulation the excess of pressure in the intermediate spaces which taper in the shape of a wedge towards the pure air side is higher than it is on the side where the air enters, so that the height of the layer of the filtering material increases from the dust laden air side to the pure air side in accordance with the increase in the pressure. According as the crests of the undulations are turned towards the dust laden or the pure air side, so the lower or upper part of the undulation is made a filter. The parts of the undulations may be advantageously divided into crests of undulations and the edge of the one part of the undulation which lies outside on the dust laden air side is provided with a bent or curled over part which embraces the adjacent boundary edge of the other part of the undulation. The surfaces so separated may be pivotally suspended which secures the additional advantage that after removal of the filter surface for the purpose of cleaning it, the solid surface associated with it can be dropped down and used to close up the empty chamber.

Several constructional forms of the invention are shown in the drawing in which:—

Figure 1 is a longitudinal section on the line A—B of Figure 2 of the constructional form in which the filter consists of separate transversely removable undulations the lower parts of which form the filtering surfaces.

Figure 2 is a section on the line C—D of Figure 1 and

Figure 3 is a side elevation.

Figure 4 is a longitudinal section on the line E—F of Figure 5 of another constructional form in which the upper part of the undulation acts on the filtering surface.

Figure 5 is a section on the line G—H of Figure 4 and

Figure 6 is a side elevation.

Figure 7 shows a third constructional form in longitudinal section on the line I—K of Figure 8, in which the undulations are divided and the lower part which forms the filtering surface is removable.

Figure 8 is a section on the line L—M of Figure 7 and Figure 9 is a side elevation.

Figure 10 shows a further constructional form in section on the line N—O of Figure 11, in which the divided parts of the undulations are pivotally suspended.

Figure 11 is a section on the line P—Q of Figure 10 and

Figure 12 is a side elevation.

The direction in which the air flows is indicated by arrows, the dust laden air chamber being on the left and the pure air chamber on the right.

As shown in Figures 1 to 3 the several undulations *a* are pressed and packed against the supporting frame *d* by means of the bars *f*, the screws *g* and the fixed side supports *h*. The supporting frame is closely connected at its periphery with the walls of the chamber which enclose the filter. The filtering layer *e* is spread out on the lower part $b$ of the undulation which dips towards the pure air side and forms a filtering surface and can be removed with the entire undulation $a$ transversely to the course of the undulations and furthermore on the dust laden air side. As in consequence of the congestion of the air in the wedge-shaped intermediate spaces the excess of pressure at $x$ is higher than it is at $y$ on the side where the air enters, the passage of the air and the uniform attraction of the entire available filtering surface are equalized by the fact that the height of the layer is greater at $x$ than at $y$ corresponding to the increase in the pressure.

In the constructional form shown in Figures 4 to 6 in which the crest of the undulations $a$ is turned towards the pure air side, the upper part $c$ is made the sieve and covered with the filtering material $e$. The method of removal and the height of the layer are the same as in the first constructional form.

In the constructional form shown Figures 7 to 9 the parts $b$ and $c$ in the crest of the undulation are made in two parts and the edge of the part $b$ of the undulation which is on the outside with respect to the dust laden air side is provided with a bent or curled over part $m$ which embraces the adjacent boundary edge $n$ of the other part of the undulation. For the purpose of better engagement the edge $n$ may be bent up in the form of a hook. The filtering material is preferably piled up to such a height that it covers over the connecting and abutting joints. This division ensures that only the filtering surface $b$ needs to be withdrawn for the purpose of cleaning on the dust laden air side. The upper parts $c$ of the undulations are held by the supporting walls $k$.

In the constructional form shown in Figures 10 to 12 both parts $b$ and $c$ of the undulations are pivotally suspended on axles $l$ on the pure air side the said axles $l$ being carried in bearings in the side supporting walls $k$. In consequence hereof not only can the part $b$ of the undulation which acts as the filtering surface be removed but after it has been removed the solid surface assigned to it can be also dropped down after which it serves to close the empty chamber as is indicated by dot and dash lines in Figure 10.

What I claim is:—

1. A gas filter comprising a plurality of perforate and imperforate plates alternating with each other in vertical zig-zag arrangement defining substantially V-shaped inter-spaces and a flange extending upwardly from the lower edge of each perforate plate to form a retaining wall for filtering material thereon.

2. A gas filter comprising a plurality of perforate and imperforate plates alternating with each other in vertical zig-zag arrangement defining substantially V-shaped inter-spaces, a flange extending upwardly from the lower edge of each perforate plate to form a retaining wall for filtering material thereon and means for permitting removal of each perforate plate independently of the others.

3. A gas filter comprising a plurality of perforate and imperforate plates alternating with each other in vertical zig-zag arrangement defining substantially V-shaped inter-spaces, the said interspaces being entirely open at the side determined by the higher edges of the perforate plates and partly closed at the side determined by the lower edges of the perforate plates by closing means extending upwardly therefrom.

4. A gas filter comprising a plurality of perforate and imperforate plates alternating with each other in vertical zig-zag arrangement defining substantially V-shaped inter-spaces and means for detachably connecting the perforate plates between the adjacent imperforate plates.

5. A gas filter comprising a frame including two side walls and open ends, a plurality of perforate and imperforate plates alternating with each other between the side walls in vertical zig-zag arrangement defining substantially V-shaped inter-spaces in the direction of the open ends and means for detachably connecting the perforate plates between the adjacent imperforate plates to make them separately removable from one of the open ends.

6. Construction according to claim 5 in which the lower edge of each imperforate plate is curved defining a hook portion and the higher end of each perforate portion is bent for engagement with said hook portion.

7. A gas filter comprising a frame including two side walls and open ends, a plurality of alternately perforate and imperforate portions pivotally mounted between the side walls in zig zag relation defining substantially V-shaped inter-spaces opening in the direction of the open ends and the perforate plates being detachably disposed between the adjacent imperforate plates.

8. Construction according to claim 7, in which each imperforate plate and the adjacent perforate plate above it have pivotal movement about the same axis and each perforate plate and the imperforate immediately above it are detachably interconnected at their front edges.

9. Construction according to claim 8, in which the front edges of the imperforate plates are bent downwardly and rearwardly defining hook portions adapted to embrace the front edges of the perforate plates.

10. A gas filter comprising a frame including two side walls and open ends, a plurality of alternately perforate and imperforate plates extending between the side walls in zig-zag arrangement, the perforate plates being upwardly inclined toward the gas stream to be filtered and the front and rear edges thereof being turned up for maintaining filtering material in place, and means whereby the perforate plates may be detached independently of each other.

In testimony whereof, I affix my signature in presence of two witnesses.

ALFRED BUDIL.

Witnesses:
  Max Ullmann,
  Walter Adams.